United States Patent [19]

Bancroft

[11] Patent Number: 4,576,502
[45] Date of Patent: Mar. 18, 1986

[54] EXTRUDED METAL CORNER CONSTRUCTION

[76] Inventor: Joseph C. Bancroft, 102 Sweetwater Club Blvd., Longwood, Fla. 32750

[21] Appl. No.: 570,941

[22] Filed: Jan. 16, 1984

Related U.S. Application Data

[63] Continuation-in-part of Ser. No. 237,394, Feb. 23, 1984.

[51] Int. Cl.$^4$ .............................................. E04C 2/38
[52] U.S. Cl. ...................................... 403/231; 52/656; 403/403
[58] Field of Search .................. 403/231, 403; 52/475, 52/656, 204, 206, 209, 210, 205, 731, 732, 730, 235, 397, 398

[56] References Cited

U.S. PATENT DOCUMENTS

| | | | |
|---|---|---|---|
| 1,110,009 | 9/1914 | Ritter | 403/231 |
| 2,601,164 | 6/1952 | Montgomery | 403/231 |
| 2,687,194 | 8/1954 | Kelly | 52/475 |
| 3,002,235 | 10/1961 | Fountain | 52/731 |
| 3,071,215 | 1/1963 | Gall | 52/235 |
| 3,100,917 | 8/1963 | Wagner | 52/455 |
| 3,140,763 | 7/1964 | Edelstein | 52/235 |
| 3,363,922 | 1/1968 | Anderson | 52/475 |
| 3,712,005 | 1/1973 | Eschbach | 52/731 |
| 4,193,238 | 3/1980 | Chalmers | 52/656 |

FOREIGN PATENT DOCUMENTS 0635213  11/1978  U.S.S.R. ................................ 52/475

Primary Examiner—John E. Murtagh
Attorney, Agent, or Firm—Duckworth, Allen, Dyer & Pettis

[57] ABSTRACT

A corner construction having high strength and resistance to torsional forces for use with hollow elongate tubing members. A first longitudinal member extruded from aluminum includes a pair of parallel planar walls connected by a planar web along one edge and a stepped web along the other edge. A second similar member is provided having a spacing of its walls for slidably receiving the first member therebetween. The stepped web of the second member at a terminal end thereof is cut away to form steps complementary to the stepped web of the first member. A terminal end of the first member is inserted between the walls of the second member to abut its planar web and to cause the stepped web to abut the cut-away steps of the second member. Fastening means is provided for maintaining the first member in its abutting relation with the second member.

7 Claims, 5 Drawing Figures

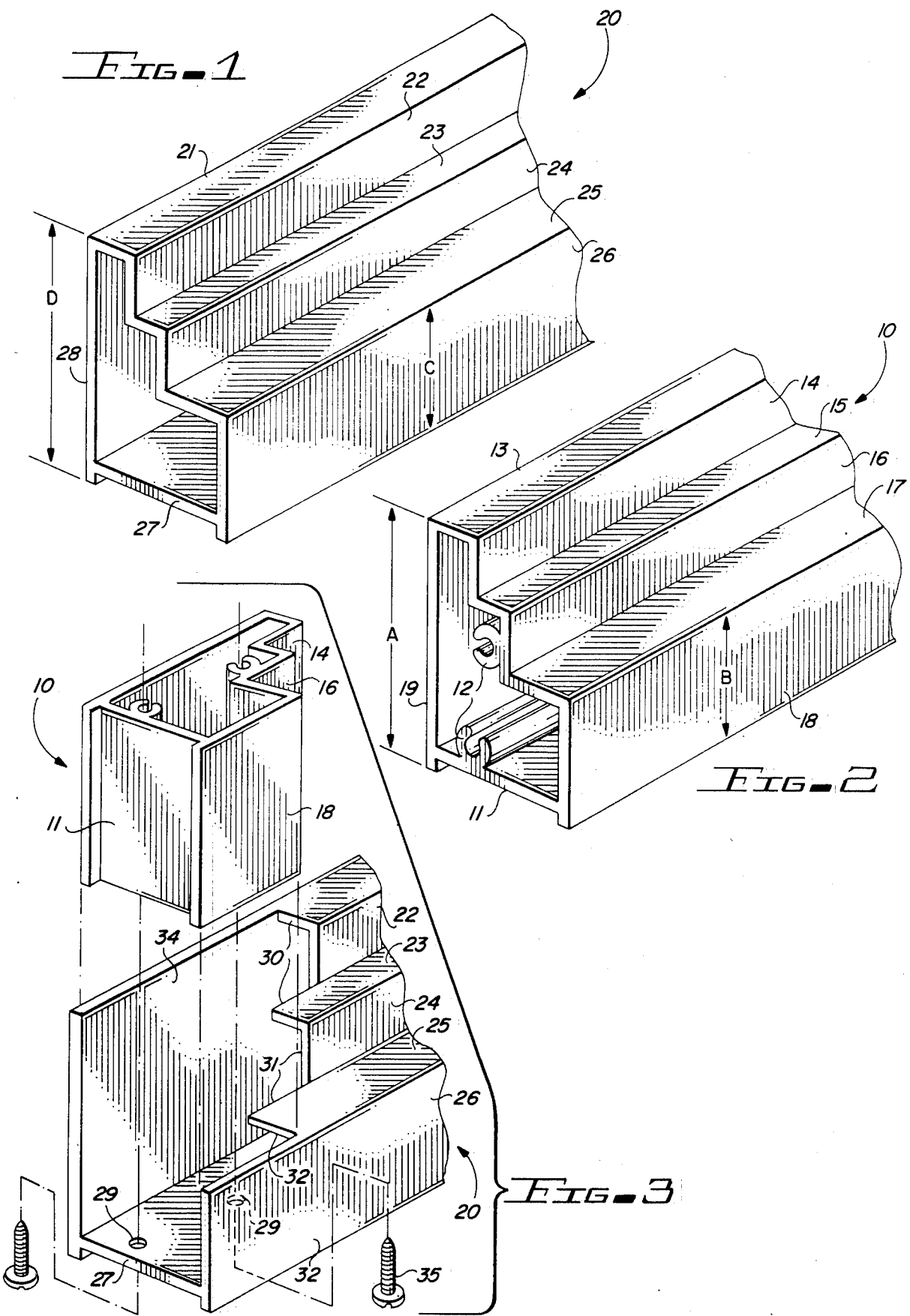

EXTRUDED METAL CORNER CONSTRUCTION

This application is a continuation-in-part of U.S. patent application Ser. No. 237,394 filed Feb. 23, 1981.

BACKGROUND OF THE INVENTION

1. Field of the Invention

The present invention relates to a corner construction for rectangular extruded metal tubing or the like, and more particularly to an improved corner useful in the manufacture of doors and windows.

2. Description of the Prior Art

A large industry presently exists in the United States and other countries for the manufacture of doors, windows, structural frames, and similar structures in which the elements thereof are formed of extruded metal. In particular, it is common to utilize extruded aluminum of a hollow cross-section having a generally rectangular shape for such structures. These extruded metal shapes are cut to required lengths and assembled to form a rectangular or square frame for doors, windows, and the like. Conventionally, the practice has been to cut the ends to form a 45° angle and to assemble the lengths to form mitered corners. Due to the hollow construction of the metal extrusions, it has been necessary to add additional elements to the corners, such as gussets and the like, to permit screws, rivets, or other fasteners to be used to securely tie the corners together. The well-known miter joint is therefore dependent upon the gussets to provide strength and rigidity since the contacting surfaces of the extrusions provide little or no rigidity. Such construction requires additional manufacturing operations in producing the gussets and additional labor for installing the gussets during assembly.

There have been attempts made to provide a more rigid and stronger corner joint for joining such hollow extrusions. For example, in U.S. Pat. No. 4,143,493 to Booi, a window frame structure is disclosed in which the extrusions are abutted at the corners and the junction between the abutting frame members is accomplished by a screw in one member engaging a tongue in the other member. Although this construction is simpler to assemble than a mitered corner, it lacks torsional strength. While perhaps suited for window use, the joint would not be satisfactory for doors. In U.S. Pat. No. 3,166,163 to Wahlfeld, a corner construction is taught in which one extrusion includes a groove along a surface to be joined and the joining extrusion includes a projecting tongue which fits into the groove of the first section. The tongue is then welded to the groove. Although an improvement over Booi, assembly of the Wahlfeld corner requires a welding operation and the majority of torsional forces would be applied to a relatively narrow tongue portion of one element. Mendelsohn in U.S. Pat. No. 3,081,852 shows a window frame for a storm sash in which a partially abutting joint is disclosed. However, this patent discloses channel-type extrusions rather than the tubing-type extrusions with which the present invention is concerned.

Therefore, there is a need for a simple, strong and rigid corner joint construction for use with rectangular, hollow tubes which can be assembled with a minimum of material and labor.

SUMMARY OF THE INVENTION

The present invention is a corner construction suitable for use with metal frame windows, doors, and the like. The corner construction is made possible by a special extrusion. Two similar extrusions are required. The first extrusion is an elongate hollow tube having a pair of spaced apart parallel planar walls. One wall may have a height sowewhat greater than the opposite wall; for example, a two-to-one ratio. An orthogonal web of metal joins one pair of edges of the two walls and is integrally connected thereto. The edge of the shorter wall is connected to the opposite wall by means of an integral web of metal formed as a plurality of steps therebetween. As may now be understood, the unequal width planar walls, together with the orthogonal web and the stepped web, form a hollow extruded metal tube. In addition to the construction just described for the first member, a pair of screw bosses is disposed and attached to the interior surfaces of the connecting webs. As discussed hereinafter, the bosses are utilized in producing the joint of the invention.

The second member is also formed as two elongate, rectangular, spaced apart, parallel planar walls having identical dimensions to that of the first member. The planar orthogonal connecting web and the stepped connecting web of the second member is similar to those of the first member except that the lengths thereof are greater by the wall thicknesses of the wall elements.

To form a corner joint in accordance with the invention, an end of the first member is cut squarely across as is an end of the other member to be joined. The stepped connecting web of the wider member is then cut away in a stepped manner with the first step dimension equal to the short wall dimension of the extrusions which forms the first step of the web; the second step dimension equal to the height of the second step; and the third step dimension equal to the height of the third step for a connecting web having three steps. In the event that a greater or less number of steps was used, the number of cutout steps would be changed appropriately.

Advantageously, the cutout steps in the second member are complementary to the steps in the second member. Therefore, the end of the first member may be inserted at right angles to the first member such that the walls of the first member fit snuggly between the walls of the second member; and the stepped web of the first member abuts the cutout steps in the stepped web of the second member. A pair of holes is provided in the orthogonal connecting web of the second member aligned with the screw bosses in the interior portion of the first member. Self-tapping metal screws may then be driven through these holes into the bosses securely locking the first member in place abutting the second member.

The construction as just described provides a surprisingly rigid and strong joint which will withstand bending forces and torsional forces. It has been found that the aluminum extrusion will generally fail before the joint fails when subject to such forces.

The surprising strength of the joint of the invention appears to result from the large number of right-angle abutting elements between the two members. For example, the entire end surfaces of the first member are in full normal and intimate contact with the interior surface of the connecting web of the second member; the inner surfaces of the second member walls are in full overlapping contact with the outer wall surfaces of the first member; and each cut-away step of the stepped web portion of the second member is in full normal contact with the outer step surfaces of the first member. Advantageously, the corner joint of the invention can be assembled extremely quickly with unskilled labor, thereby reducing the cost of fabrication of products utilizing the joint.

As will be recognized, square or rectangular frames may be constructed by using a pair of first members and a pair of second members joined by the corners of the invention. Such frames are eminently suited for the construction of windows, doors, screens, mirrors, and other similar products. A frame made in accordance with the invention requires a minimum of skill and labor to assemble and provides high strength and resistance to torsional forces.

As a result of the novel stepped web construction, a completed frame will have several recessed surfaces useful for installation of panels, glass panes, screens, etc. The step surfaces may include grooves, ribs, or other shapes without affecting the joint strength.

It is therefore a principal object of the invention to provide a simple, overlapping corner joint construction applicable to hollow rectangular tube members having high strength and resistance to torsional forces.

It is another object of the invention to provide a corner construction for metal or plastic extrusions that can be assembled very quickly and at low cost.

It is still another object of the invention to provide such a corner construction that requires no gussets, brackets, or other reinforcing elements and can be held together by a minimum number of screws.

It is yet another object of the invention to provide a right angle corner joint for aluminum extrusions adaptable for the manufacture of screen doors, storm doors, and similar products.

These and other objects and advantages of the invention will become apparent from the following detailed description when read in conjunction with the drawings.

BRIEF DESCRIPTION OF THE DRAWINGS

FIG. 1 is a terminal end view of one longitudinal member in accordance with the invention;

FIG. 2 is a terminal end view of another longitudinal member;

FIG. 3 is an exploded view of a corner joint for the members of FIG. 1 and FIG. 2;

DETAILED DESCRIPTION OF THE PREFERRED EMBODIMENT

Figure 4:
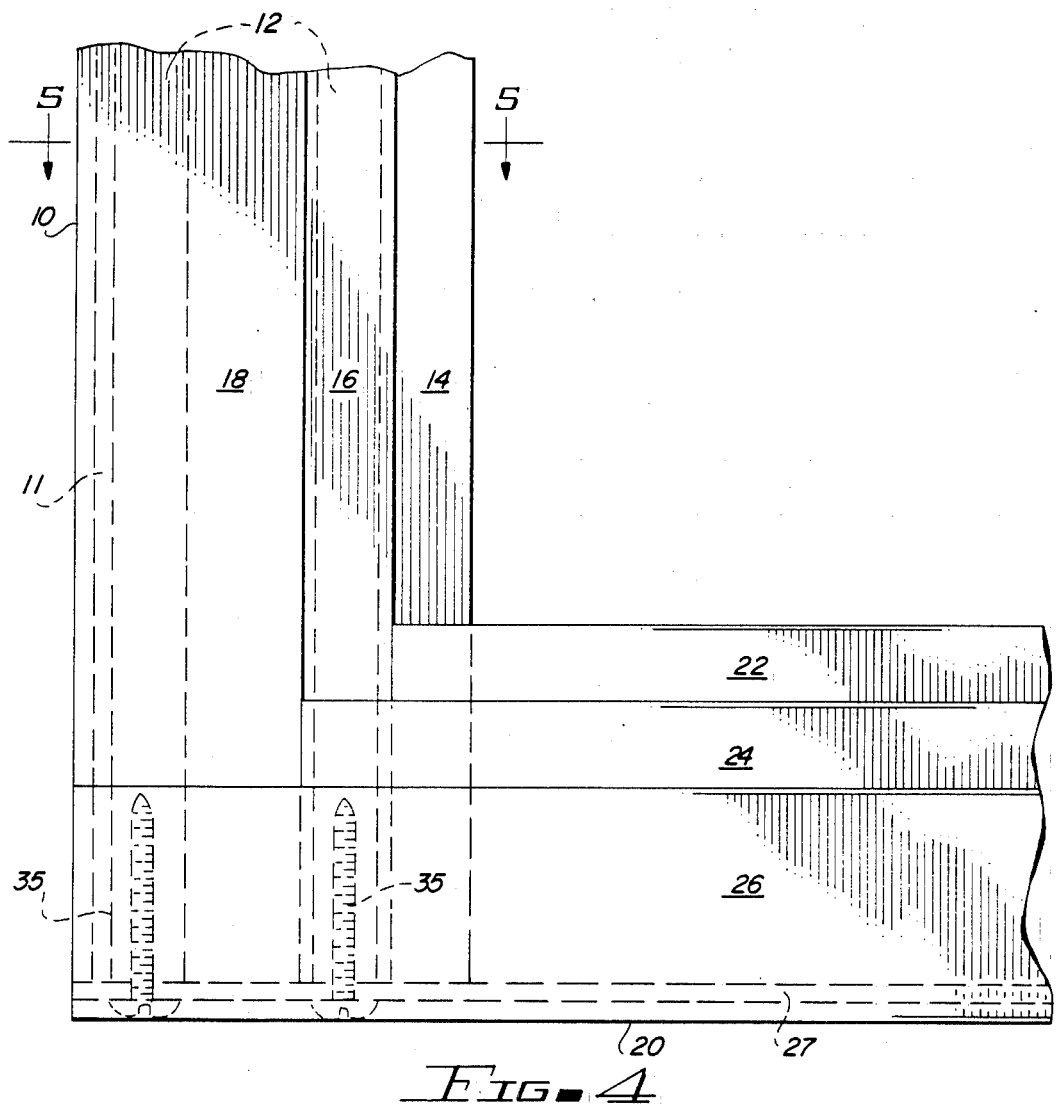
FIG. 4 is a plan view of the corner joint formed as shown by FIG. 3.

The corner of the invention utilizes two elongate hollow longitudinal tubing members essentially rectangular in cross-section. End views of a first and second member 10 and 20 are shown in FIGS. 1 and 2 which are suitable for practicing the invention. It is to be understood that the particular cross-sectional profiles shown are for exemplary purposes only and many other suitable similar shapes will be obvious to those of skill in the art.

A first member 10 in FIG. 2 includes a pair of spaced apart parallel planar walls 8 and 19. It may be noted that wall 18 has a narrow dimension B somewhat less than the narrow dimension A of wall 19. For example, a 2:1 ratio of this dimension has been found to contribute to a strong joint. Walls 18 and 19 are integrally connected by a planar web 11 which is orthogonal to each wall. As may be seen, web 11 is disposed a short distance from the edges of walls 18 and 19 to form a shallow channel along member 10.

The opposite unequal edges of walls 18 and 19 are integrally connected by a stepped web comprising step surfaces 13, 15, and 17 and step faces 14 and 16. Although three steps are shown for the illustrated example, a greater or less number may be used in accordance with the invention. A pair of screw bosses 12 is shown with one integral with web 11 and the other integral with step face 16.

In FIG. 1, a second member 20 configured to mate with member 10 is illustrated. Member 20 includes a pair of spaced apart parallel planar walls 26 and 28 which may have the same narrow dimensions C, D as walls 18 and 19 of member 10. It is to be understood, however, that the dimensions C, D of walls 26 and 28 may be greater or less than those of walls 18 and 19 as long as the difference in length between dimensions C and D is equal to the difference in length between dimensions A and B.

Walls 26 and 28 of member 20 are integrally connected by planar web 22 which is orthogonal to each wall and may be disposed a short distance from the edge of walls 18 and 19 to form a narrow channel along member 10. The width of web 22 is selected to be greater than the width of web 11 by an amount equal to the combined wall thicknesses of walls 18 and 19 to permit an end of member 10 to be slidably received between walls 26 and 28.

A stepped web, having step surfaces 21, 23, and 25 and step faces 22 and 24, integrally connects the other edge of walls 26 and 28. In accordance with the invention, member 20 must have the same number of steps as member 10; surfaces 21, 23, and 25 must have the same respective widths as surfaces 13, 15, and 17; and faces 22 and 24 must have the same respective widths as faces 14 and 16.

Members 10 and 20 may be extruded from metal such as aluminum or from various plastics depending upon the application of the corners. A common application is for door and window frames in which case aluminum is eminently suitable. Members 10 and 20 are preferably manufactured in long lengths and cut out to appropriate lengths as required.

To form a right angle corner in accordance with the invention, members 10 and 20 are cut to desired lengths. No further cutting of member 10 is required. The stepped web of member 20 is cut as shown in the exploded view of FIG. 3 to form a second set of steps 30, 31, and 32. Step 32 is formed by a portion of wall 26 equal in length to the width B of wall 18 and a portion of surface 25. Step 31 is formed by a portion of surface 25 and of face 24, and step 30 is formed by a portion of surface 23 and face 22. The cutout portion of surface 25 is equal in length to the width of face 16 of member 10, and the cutout portion of surface 23 is equal in length to the width of face 14 of member 10. A pair of holes 29 is drilled in web 27 to accept screws 35.

Figure 5:
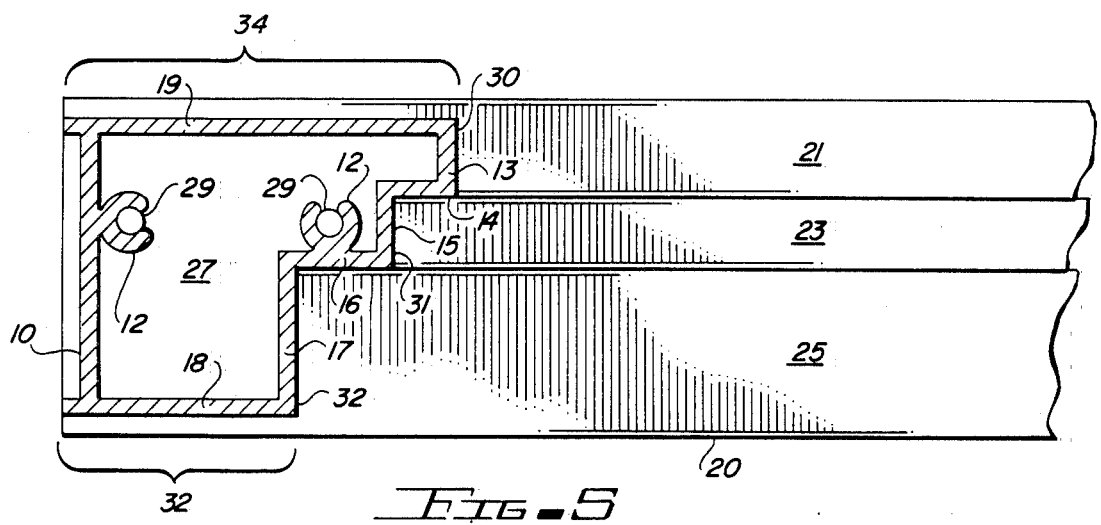
FIG. 5 is a cross-sectional view of the corner joint of FIG. 4 through the plane 5—5.

A terminal end of member 10 is inserted between walls 26 to abut web 27. As best seen in FIGS. 4 and 5, self-threading screws 35 are driven into bosses 12 to draw the terminal end of member 10 in firm abutting contact with web 27. Step portion 32 of wall 26 is in overlapping relationship with wall 18 of member 10, and wall portion 34 of member 20 is in overlapping relationship with wall 19 of member 10. Cutout step portion 32 of surface 25 is in orthogonal abutting relationship with surface 17 of member 10, and cutout step portion 31 of surface 25 is in orthogonal abutting relationship with face 16 of member 10. Similarly, cutout steps 31 and 30 abut surfaces 13 and 15, and face 14 of member 10.

The orthogonal contacts of a multiplicity of surfaces and edges formed by the above-described joint provide an exceptional degree of strength and rigidity to the joint. The assembly of the joint is advantageously performed quickly with a minimum of equipment required as contrasted with prior art joints.

As may be noted from FIG. 4, the shallow channel formed by the recessing of web 27 of member 20 permits the heads of screws 35 to be recessed which is advantageous for doors and the like. The similar channel in member 10 permits recessing of hinges and latches when the members are used for doors.

As may now be recognized, a corner construction suitable for doors, windows, screeens, and other types of frames has been disclosed having high resistance to torsional forces which is economical to manufacture and assemble. The novel stepped webs produce a plurality of recessed surfaces suitable for installation of glazing, screens, weatherstripping and the like. Although steps having a right angle between a step surface and a step face have been disclosed, it will be obvious that such steps may be formed as grooves and splines, and at other than right angle relationships as long as orthogonality is maintained between the cutout steps and the mating member web steps. Such variations and modifications will be obvious to those of skill in the art and fall within the spirit and scope of the invention.

I claim:

1. A structural corner comprising:
   (a) a first hollow elongate longitudinal tubing member having:
      (i) a first pair of spaced apart parellel planar walls, each wall having a narrow dimension lateral to the longitudinal direction of said first tubing member, in which said narrow dimension of a first one of said pair is less than said narrow dimension of the second one of said first pair;
      (ii) a planar first web integrally and orthogonally connected to and extending between said first paid of walls;
      (iii) a second web spaced apart from said first web, said second web forming a first plurality of steps extending laterally away from said first web in a staggered, non-overlapping relationship with each other and integrally connected to and extending between said first pair of walls;
   (b) a second hollow elongate longitudinal tubing member having:
      (i) a second pair of spaced apart parallel planar walls, each wall having a narrow dimension lateral to the longitudinal direction of said second tube member, and having the same difference therebetween in said narrow dimensions as said first pair, said second pair of walls spaced apart to receive said first pair of planar walls slidably therebetween;
      (ii) a planar third web integrally and orthogonally connected to and extending between said second pair of walls;
      (iii) a fourth web spaced apart from said second web, said fourth web forming a second plurality of steps extending laterally away from said third web in a staggered, non-overlapping relationship with each other and integrally connected to and extending between said second pair of walls, said fourth web cut away at its terminal end in a third plurality of cut-away steps complimentary to said first plurality of steps of said second web wherein a first one of said cut-away steps is equal in height to said first one of said first pair of walls and a last one of said cut-away steps is equal in height to said second one of said first pair of walls; (iv) said first member disposed between said second pair of walls of said second member with a terminal end thereof in abutting relation with said planar third web and with said first plurality of steps of said second web disposed in abutting orthogonal relation with said third plurality of cut-away steps of said fourth web, and such that said second walls of both of said first and second wall pairs of said first and second members are in abutting relationship; and
   (c) securing means for maintaining said first member in said abutting relation with said second member.

2. The corner as defined in claim 1 which said securing means comprises:
   at least one screw receiving boss disposed longitudinally within and integral with said one of said first and second web of first member; and
   at least one screw engaging said boss through said third web.

3. The corner as defined in claim 1 in which said narrow dimension of said first one of said first pair of walls is about twice the narrow dimension of said second one of said first pair of walls.

4. The corner as defined in claim 1 in which said first and second members are extruded from aluminum.

5. The corner as defined in claim 1 in which said first and second members are extruded from plastic.

6. A structural corner comprising:
   (a) a first hollow elongate longitudinal tubing member having:
      (i) a first pair of spaced apart parallel planar walls, each wall having a narrow dimension lateral to the longitudinal direction of said first tubing member, in which said narrow dimension of a first one of said pair is less than said narrow dimension of the second one of said first pair;
      (ii) a planar first web integrally and orthogonally connected to and extending between said first pair of walls;
      (iii) a second web spaced apart from said first web, said second web forming at least three steps extending laterally away from said first web in a staggered, non-overlapping relationship with each other, and integrally connected to and extending between said first pair of walls;
   (b) a second hollow elongate longitudinal tubing member having:
      (i) a second pair of spaced apart parallel planar walls, each wall having a narrow dimension lateral to the longitudinal direction of said second tube member, and having the same difference therebetween in said narrow dimensions as said first pair, said second pair of walls spaced apart to receive said first pair of planar walls slidably therebetween;
      (ii) a planar third web integrally and orthogonally connected to and extending between said second pair of walls;
      (iii) a fourth web spaced apart from said second web, said fourth web forming at least three steps extending laterally away from said third web in a staggered, non-overlapping relationship with each other and integrally connected to and extending between said second pair of walls, said fourth web cut away at its terminal end in at least three cut away steps complimentary to said steps of said second web, wherein a first one of said cut away steps is equal in height to said first one of said first pair of walls and a last one of said cut away steps is equal in height to said second one of said first pair of walls;

(iv) said first member disposed between said second pair of walls of said second member with a terminal end thereof in abutting relationship with said planar third web and with said steps of said second web disposed in abutting orthogonal relationship with said cut away steps of said fourth web, and such that said second walls of both of said first and second wall pairs of said first and second members are in abutting relationship; and (c) securing means including first and second screw bosses integrally formed with and extending longitudinally along said first and second webs and a pair of screws, each screw extending through said third web and into one of said screw bosses for maintaining said first member in said abutting relationship with said second member.

7. A structural corner comprising:
(a) a first hollow elongate longitudinal tubing member having:
  (i) a first pair of spaced apart parallel planar walls, each wall having a narrow dimension lateral to the longitudinal direction of said first tubing member, in which said narrow dimension of a first one of said pair is less than said narrrow dimension of the second one of said first pair;
  (ii) a planar first web integrally and orthogonally connected to and extending between said first pair of walls;
  (iii) a second web spaced apart from said first web, said second web forming three steps extending laterally away from said first web in a staggered, non-overlapping relationship with each other, and with each of said steps having a progressively smaller dimension progressively from said first wall to said second wall of said first wall pair;

(b) a second hollow elongate longitudinal tubing member having:
  (i) a second pair of spaced apart parallel planar walls, each wall having a narrow dimension lateral to the longitudinal direction of said second tube member, and having the same difference therebetween in said narrow dimensions as said first pair, said second pair of walls spaced apart to receive said first pair of planar walls slidably therebetween;
  (ii) a planar third web integrally and orthogonally connected to and extending between said second pair of walls;
  (iii) a fourth web spaced apart from said second web, said fourth web forming three steps extending laterally away from said third web in a staggered, non-overlapping relationship with each other and integrally connected to and extending between said second pair of walls, said fourth web cut away at its terminal end in three cut away steps complimentary to said three steps of said second web;
  (iv) said first member disposed between said second pair of walls of said second member with a terminal end thereof in abutting relationship with said planar third web and with said three steps of said second web disposed in abutting orthogonal relationship with said three cut away steps of said fourth web, and such that said second walls of both of said first and second wall pairs of said first and second members are in abutting relationship; and (c) securing means including first and second screw bosses integrally formed with and extending longitudinally along said first and second webs and a pair of screws, each screw extending through said third web and into one of said screw bosses for maintaining said first member in said abutting relationship with said second member.

* * * * *